(12) United States Patent
Niimi

(10) Patent No.: US 7,592,731 B2
(45) Date of Patent: Sep. 22, 2009

(54) DC ROTARY ELECTRIC MACHINE HAVING BALANCE WINDING FOR REDUCING VARIATIONS IN MAGNETIZING FORCE BETWEEN RESPECTIVE FIELD MAGNET POLES

(75) Inventor: Masami Niimi, Handa (JP)

(73) Assignee: Denso Corporation, Kariya (JP)

( * ) Notice: Subject to any disclaimer, the term of this patent is extended or adjusted under 35 U.S.C. 154(b) by 460 days.

(21) Appl. No.: 11/546,370

(22) Filed: Oct. 12, 2006

(65) Prior Publication Data
US 2007/0085438 A1 Apr. 19, 2007

(30) Foreign Application Priority Data
Oct. 19, 2005 (JP) .............................. 2005-304401

(51) Int. Cl.
*H02K 1/00* (2006.01)
(52) U.S. Cl. ..................................... 310/198
(58) Field of Classification Search ................. 310/198, 310/204, 206
See application file for complete search history.

(56) References Cited

U.S. PATENT DOCUMENTS 6,218,755 B1 * 4/2001 Tanaka et al. ............... 310/204
6,844,649 B2 * 1/2005 Tanaka et al. ............... 310/195

FOREIGN PATENT DOCUMENTS

JP       A 8-009578      1/1996
JP       A 2001-342935   12/2001

* cited by examiner

*Primary Examiner*—Nguyen N Hanh
(74) *Attorney, Agent, or Firm*—Oliff & Berridge, PLC

(57) ABSTRACT

In a rotary electric machine having a field winding wound on field magnet iron cores, and an armature with an armature winding connected in series with the field winding through a pair of brushes and a corresponding pair of connecting leads that are electrically connected to the brushes, a balance winding for equalizing the magnetic field strengths of the field poles is wound around successive field magnet iron cores and thereby retained, and has one end thereof fixedly attached to and electrically connected to one of the connecting leads and the other end electrically connected to and fixedly attached to the other connecting lead.

5 Claims, 3 Drawing Sheets

DC ROTARY ELECTRIC MACHINE HAVING BALANCE WINDING FOR REDUCING VARIATIONS IN MAGNETIZING FORCE BETWEEN RESPECTIVE FIELD MAGNET POLES

CROSS-REFERENCE TO RELATED APPLICATIONS

This application is based on and incorporates herein by reference Japanese Patent Application No. 2005-304401 filed on Oct. 19, 2005.

BACKGROUND OF THE INVENTION

1. Field of Application

The present invention relates to a rotary electric machine in which a circulating current flows from an armature winding through brushes into field windings of the machine.

2. Description of Related Art

Types of rotary electric machine are known which have an armature formed with four or more poles, with an armature winding lap-wound on the poles, and a field winding connected in series with the armature winding via brushes. With such a rotary electric machine, if differences arise between the levels an electromagnetic force produced between the poles of the armature, a circulating current flows from the armature winding, through the brushes to the field winding. An example of the electrical circuit of such a rotary electric machine is shown in FIG. 2, which will be assumed to operate as a DC motor. This has a field winding formed of four field coils $6a$, $6b$, $6c$, $6d$ that are connected successively in series, with a pair of positive-side brushes $3a$, $3b$ (i.e., brushes that are at a more positive potential than an opposing pair of brushes, referred to as the negative-side brushes, due to the direction of flow of current into/out of the armature winding) being respectively connected to the connection point 11 of the field coils $6b$, $6c$ and to the connection point 12 of the field coils $6a$, $6d$, and a pair of negative-side brushes $3c$, $3d$ that are connected to ground potential, i.e., are connected to the low-potential side of a power supply such as a vehicle battery which applies a positive DC supply voltage via a motor lead 7 to the connection point 9 of the field coils $6a$, $6b$ and to the connection point 10 of the field coils $6c$, $6d$.

With this configuration, if the potential of the positive-side brush $3a$ becomes higher than that of the positive-side brush $3b$, then a circulating current will flow through the four field coils $6a$, $6b$, $6c$, $6d$ in the directions indicated by the arrow lines. In this case, the circulating currents that flow in the field coils $6a$ and $6d$ will flow in the same direction as the currents supplied from the battery that respectively flow through the field coils $6a$, $6d$. Conversely, the circulating currents that flow in the field coils $6a$ and $6d$ will flow in the opposite direction to the currents supplied from the battery that respectively flow through these field coils.

Hence, the magnetic field strength of the field magnet poles corresponding to the field coils $6a$, $6d$ will become higher than that of the field magnet poles corresponding to the field coils $6b$, $6c$, i.e., an unbalance will arise between the strengths of the magnetic fields produced by each of the field magnet poles corresponding to the field coils $6a$, $6d$ and the strengths of the magnetic fields produced by each of the field magnet poles corresponding to the field coils $6b$, $6c$.

In an attempt to overcome this problem, it has been proposed to incorporate an additional conductor, referred to as a balance winding or balancer, that is connected between the positive-side brushes $3a$ and $3b$ for reducing the level of circulating current that flows to the field windings, for example as described in Japanese patent publication No. 08-009578. This proposed balance winding is formed in a semicircular shape, and is disposed along the inner periphery of the yoke, with the opposing ends of the balance winding being electrically connected to and fixedly attached to respective ones of a pair of connection terminals that are coupled to respective connecting leads of the positive-side brushes.

However with such a configuration, it is important to reliably retain the balance winding in a fixed condition. If this is not done, then in the case of a rotary electric machine that is subjected to high levels of external applied vibration (such as a vehicle starter motor), vibration may cause the balance winding to come into contact with the inner surface of the yoke, which can result in short-circuits, or the vibration may cause an open-circuit in the balance winding. Hence in the case of such a type of rotary electric machine that is subjected to severe vibration, it has been necessary to provide a dedicated electrical insulation member for the balance winding, i.e., with the balance winding being embedded within that electrical insulation member. This will result in increased manufacturing cost.

Furthermore with an arrangement in which the balance winding is disposed along the inner circumference of the yoke, the requirements for dimensional accuracy of the balance winding become substantially stringent, which results in further increases in manufacturing cost.

SUMMARY OF THE INVENTION

It is an objective of the present invention to overcome the above problems, by providing a rotary electric machine having a balance winding, which does not require any additional means to be incorporated for the purpose of securely retaining the balance winding with a high degree of reliability, and so which can be manufactured at lower cost than previous types of rotary electric machine that incorporate a balance winding.

To achieve the above objective, according to a first aspect, the invention provides a rotary electric machine comprising a field winding that is lap wound on a plurality of field magnet iron cores, an armature having at least four magnetic poles, formed by an armature winding that is wound on armature iron cores and is connected in series with the field winding via a pair of positive-side brushes, a pair of connecting leads which electrically connect the armature winding to the pair of positive-side brushes, and a balance winding for reducing magnetic force unbalance effects that result from a circulating current that flows from the armature winding through the field winding. The rotary electric machine of the invention is characterized in that the balance winding is wound around successive ones of a plurality of the field magnet iron cores, and so is thereby secured by the field magnet iron cores. In addition, the balance winding has a first end thereof electrically connected to and fixedly attached to a first one of the pair of connecting leads, and has a second end thereof electrically connected to and fixedly attached to a second one of the pair of connecting leads.

Such a configuration has the advantage that since the balance winding is wound around each of a plurality of the field magnet iron cores in succession, it is reliably held in place by these iron cores, so that the balance winding will be highly resistant to the effects of vibration, with greatly reduced danger of open-circuits or short-circuits occurring, by comparison with prior art methods in which the balance winding is disposed along the inner circumference of the yoke of the rotary electric machine.

In addition, it becomes unnecessary to provide any special insulating member for the balance winding, to prevent occurrence of short-circuits to the yoke that might be caused by vibration affecting the balance winding.

For these reasons, the invention enables manufacturing costs of such a rotary electric machine to be reduced by comparison with the prior art.

Preferably, the balance winding is wound directly upon the field magnet iron cores. Hence, this can be done by the same winding process that is used to form the field winding, and by using the same installation to perform the winding process. Thus, simplification of the manufacture and further reductions in manufacturing cost can be achieved, by comparison with the prior art.

With the balance winding wound directly onto the field magnet iron cores, the field winding is then wound over the balance winding. Hence, the field winding will press upon the outer side of the balance winding, thereby further ensuring that the balance winding will be held securely in place, irrespective of the effects of vibration.

Furthermore in that case, since the balance winding can be formed of a conductor which has a smaller cross-sectional area than the conductors of the field winding, the presence of the balance winding on the field magnet iron cores will not have any significant adverse effect upon forming the field winding, e.g., as lap-wound coils.

With such a rotary electric machine, the direction of winding the balance winding around the field magnet iron cores is predetermined such that when circulating currents flow in the balance winding and in the field winding respectively (i.e., as a result of a potential difference existing between the pair of positive-side brushes), the respective polarities of the magnetic fields that are produced by the flow of circulating current in the balance winding are such as to suppress variations between the respective strengths of the magnetic fields of the poles of the field magnet (i.e., variations that are caused by the flow of circulating current in the field winding).

In that way, such variations in magnetic field can be effectively cancelled, so that stable output power can be obtained from the rotary electric machine.

DESCRIPTION OF PREFERRED
EMBODIMENTS

Figure 1:
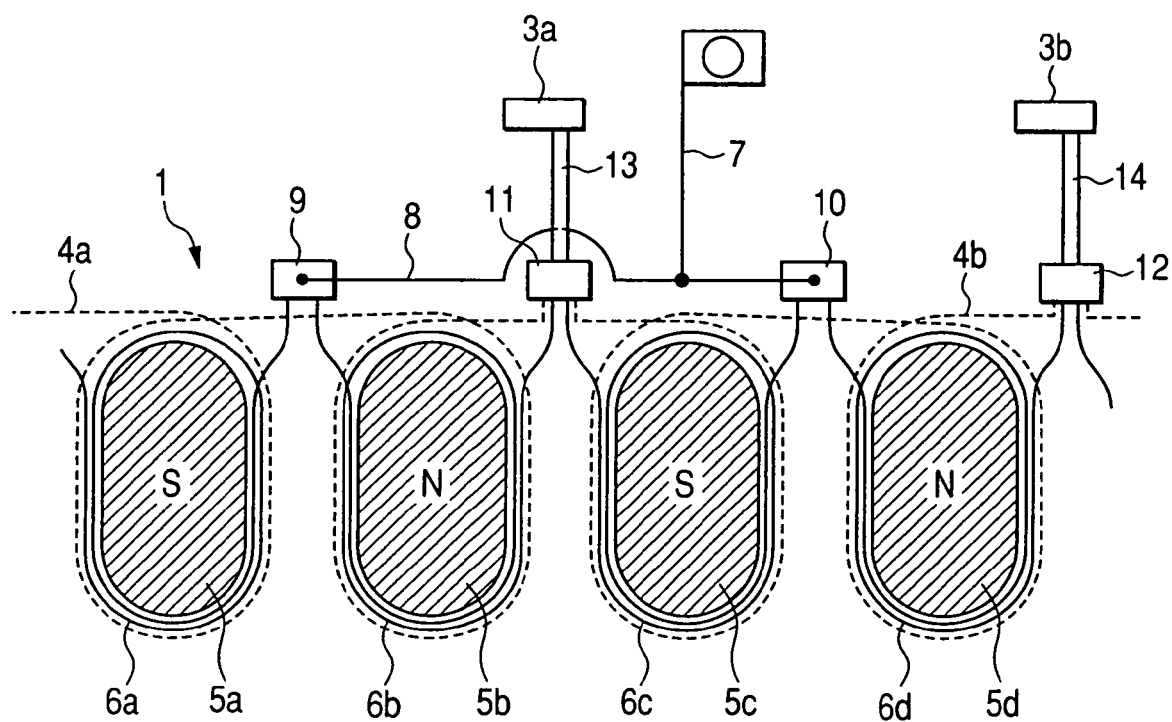
FIG. 1 is a developed view illustrating the circumferentially inward sides of a field magnet of an embodiment of a rotary electric machine.
Figure 2:
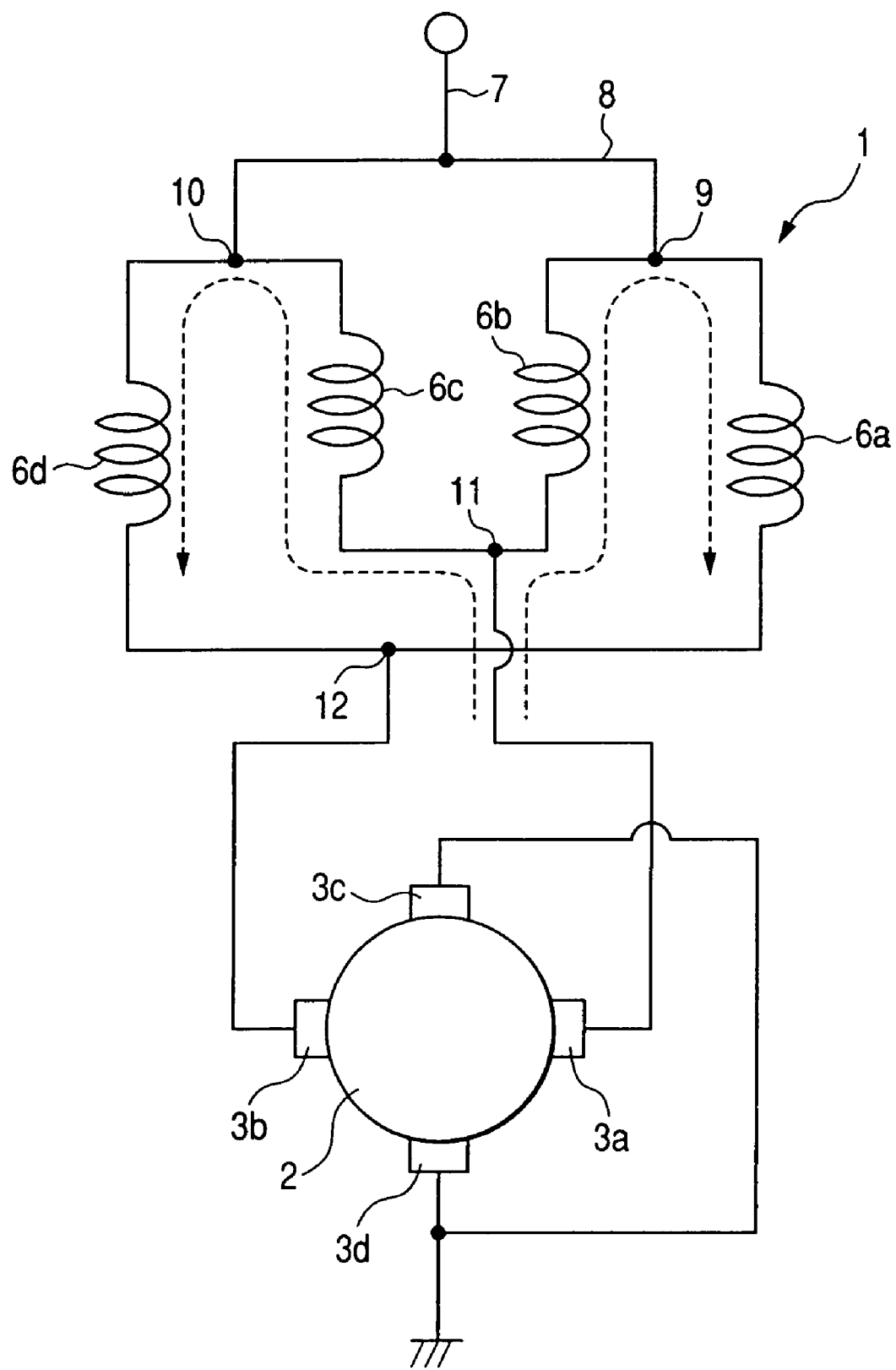
FIG. 2 is a circuit diagram of the embodiment.

FIG. 1 is a developed diagram illustrating the inner circumference of a field magnet 1 of an embodiment of a rotary electric machine. This embodiment will be assumed to be a DC motor which is wired in accordance with the circuit diagram of FIG. 2 described hereinabove. The armature 2 shown in FIG. 2 is rotatably mounted within the inner circumference of the field magnet 1 (i.e., with the armature winding being constituted as a rotor winding and the field winding constituted as a stator winding of the embodiment). When voltage of a battery (i.e., a voltage that is positive with respect to ground potential) is applied to the motor lead 7, currents which thereby flow through the field coils 6a, 6b, 6c, 6d and through the positive-side brushes 3a, 3b to the armature winding of the armature 2 (and hence via the brushes 3c, 3d to ground potential) result in electromagnetic forces being applied to the armature 2 that produce rotation of the armature 2.

The embodiment could for example be for use as a starter motor for the engine of a vehicle.

The field magnet 1 includes a yoke (not shown in the drawings) that is of tubular shape, which forms part of a magnetic circuit, and four field magnet iron cores 5a, 5b, 5c, 5d each fixedly mounted on the inner circumference of the yoke. The field coils 6a, 6b, 6c, 6d are wound around respective ones of the four field magnet iron cores 5a, 5b, 5c, 5d, which are disposed at equidistant intervals around the inner circumference of the yoke. When current is passed through the field coils 6a, 6b, 6c, 6d, then as illustrated in FIG. 1, each of the field magnet iron cores 5a, 5b, 5c, 5d becomes magnetized with a polarity that is opposite to that of the two immediately circumferentially adjacent ones of the field magnet iron cores 5a, 5b, 5c, 5d.

The field coils 6a, 6b, 6c, 6d are each formed of a plurality of bundled narrow-gage wires (in general, copper wires). As illustrated in FIG. 2, the field coils 6a, 6b, 6c, 6d are connected in parallel between the motor lead 7 and the field coils 6a, 6b, 6c, 6d. More specifically, the field coils 6b, 6c are connected in parallel between the motor lead 7 and the positive-side brush 3a, while the field coils 6a, 6d are connected in parallel between the motor lead 7 and the positive-side brush 3b.

The motor lead 7 is connected to a motor terminal of an electromagnetic switch (not shown in the drawings), and when the switch is closed, a positive voltage from a battery (not shown in the drawings) applied to the motor lead 7, so that current flows through the field coils 6a, 6b, 6c, 6d, the directions in which the field coils 6a, 6b, 6c, 6d are wound around the corresponding ones of the field magnet iron cores 5a, 5b, 5c, 5d are such that the respective magnetic polarities shown in FIG. 1 are formed. The motor lead 7, and respective ends of the field coils 6a, 6b, 6c, 6d, are each connected to a connection bar 8. A pair of intermediate connection terminals 9 and 10 are connected to respective opposing ends of the connection bar 8, while one end of the 6a and one end of the 6b are each connected to the intermediate connection terminal 9, and one end of the 6c and one end of the 6d are each connected to the intermediate connection terminal 10.

In addition, the other ends of each of the field coils 6a, 6d are connected in common to an intermediate connection terminal 12, while similarly, the other ends of each of the field coils 6b, 6c are connected in common to an intermediate connection terminal 11. The positive-side brush 3a is connected via a brush lead 13 to the intermediate connection terminal 11, i.e., with the intermediate connection terminal 11 being electrically connected to and fixedly attached to the brush lead 13. Similarly, the positive-side brush 3b is connected via a brush lead 14 to the intermediate connection terminal 12, i.e., with the intermediate connection terminal 12 being electrically connected to and fixedly attached to the brush lead 14.

The armature 2 has an armature winding made up of lap-wound armature coils formed on an armature iron core (not shown in the drawings) to produce four magnetic poles (although 6 poles would be equally possible). Rectifier elements (not shown in the drawings) that are mounted on an end portion of the armature 2 are connected to the armature coils, with the rectifier elements being connected in series with the field coils 6a, 6b, 6c, 6d via the positive-side brushes 3a, 3b.

Figure 3:
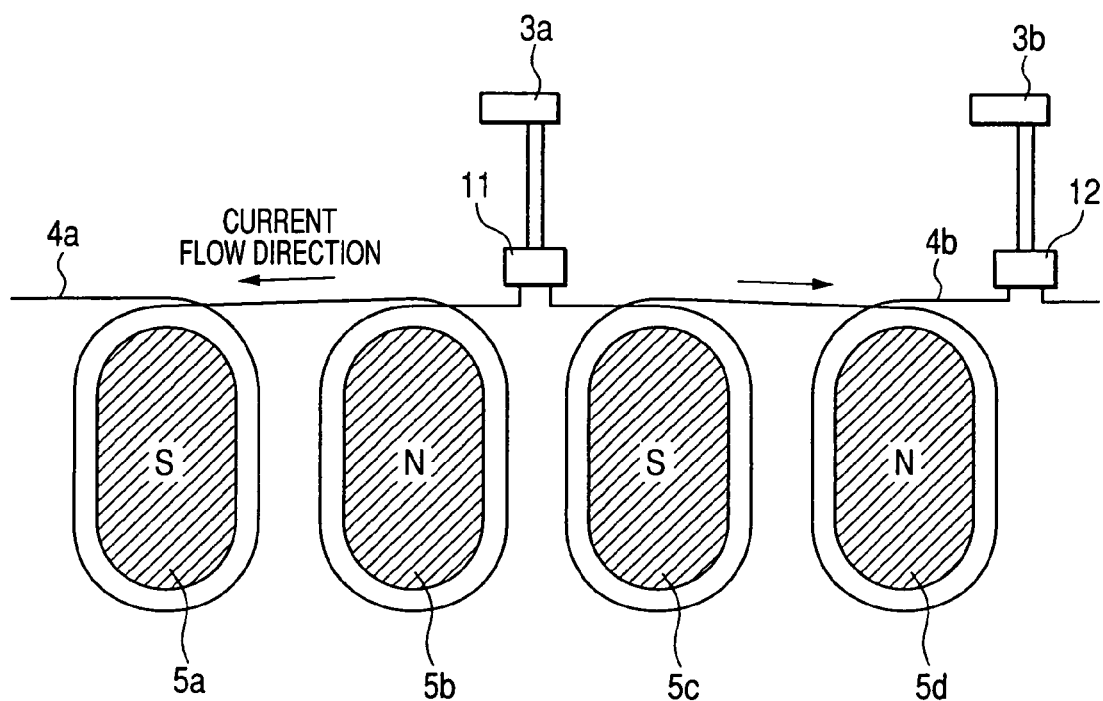
FIG. 3 is a partial developed view corresponding to FIG. 1, for use in describing the operation of a balance winding that is wound on field magnet iron cores of the embodiment.

A pair of balance windings 4a and 4b are each formed of a conductor having a cross-sectional area that is smaller than that of the conductors that constitute the field coils 6a, 6b, 6c, 6d, with each of the conductors of the balance windings 4a, 4b and of the field coils 6a, 6b, 6c, 6d being formed of copper wire, for example. It should be noted that although with this embodiment a pair of bandwidths 4a, 4b are utilized, as illustrated in FIG. 3, it would be equally possible to utilize only a single balance winding (i.e., 4a or 4b). The balance winding 4a is wound with a single turn around each of the field magnet iron cores 5a, 5b in succession, while the balance winding 4b is wound with a single turn around each of the field magnet iron cores 5c, 5d in succession.

One end of each of the balance windings 4a, 4b is electrically connected to and fixedly attached to the contact terminal 11, while the other end is electrically connected to and fixedly attached to the contact terminal 12.

The balance windings 4a, 4b is wound on the field magnet iron cores 5a, 5b, 5c, 5d before the field coils 6a, 6b, 6c, 6d are wound on respective ones of the field magnet iron cores 5a, 5b, 5c, 5d.

The directions of winding the balance windings 4a, 4b on respective ones of the field magnet iron cores 5a, 5b, 5c, 5d are predetermined whereby the magnetic fields resulting from the balance windings 4a, 4b will be such as to suppress magnetic field variations that are caused by a circulating current that flows in the field coils 6a, 6b, 6c, 6d due to a potential difference arising between the pair of positive-side brushes 3a, 3b.

Effects Obtained by Embodiment

With the above embodiment of a rotary electric machine, each of balance windings 4a, 4b is wound successively, with an identical number of turns (in the embodiment, one turn), around a plurality of the field coils 6a, 6b, 6c, 6d, and the one end of each of the balance windings 4a, 4b is electrically connected to and fixedly attached to one of the pair of connection terminals 11 and 12 the other end of each of the balance windings 4a, 4b is electrically connected to and fixedly attached to the other one of the pair of connection terminals 11 and 12.

The balance windings 4a, 4b are thereby each held securely in place, by the field magnet iron cores 5a, 5b, 5c, 5d as well as by the connection terminals 11 and 12. As a result, excellent resistance to vibration can be achieved, so that short-circuits of the balance windings 4a, 4b due to vibration can be avoided.

Furthermore, since the balance windings 4a, 4b are wound on the field magnet iron cores 5a, 5b, 5c, 5d by the same winding process that is used to wind the field coils 6a, 6b, 6c, 6d on respective ones of the field magnet iron cores 5a, 5b, 5c, 5d, installing of the balance windings 4a, 4b is simplified by comparison with prior art technology in which a balance winding is disposed along the inner circumference of the yoke of the rotary electric machine.

In particular, with the present invention, it becomes unnecessary to provide any special insulating members for the balance winding, so that due to this and due to the simplified installation process, a reduction of manufacturing cost can be achieved.

Furthermore, since each of the balance windings 4a, 4b can be formed of a conductor having a smaller cross-sectional area than that of the conductors used to form the field coils 6a, 6b, 6c, 6d, and since it is only necessary to wind each balance winding 4a, 4b once around each of a plurality of the field magnet iron cores 5a, 5b, 5c, 5d, the presence of the balance windings 4a, 4b will have no significant adverse effect upon the lap-wound configuration of the field coils 6a, 6b, 6c, 6d that are wound upon the same field magnet iron cores 5a, 5b, 5c, 5d.

However it should be noted that it would be equally possible to use respective conductors (e.g., copper wire) for the balance windings 4a, 4b that are of identical cross-sectional area to the conductors used to form the field coils 6a, 6b, 6c, 6d.

Since the field coils 6a, 6b, 6c, 6d are wound on the field magnet iron cores 5a, 5b, 5c, 5d after the balance windings 4a, 4b have been wound on the field magnet iron cores 5a, 5b, 5c, 5d, the field coils 6a, 6b, 6c, 6d press upon the outer side of the balance windings 4a, 4b. As a result, the balance windings 4a, 4b will be strongly fixed in position with respect to the field magnet iron cores 5a, 5b, 5c, 5d, with no danger of becoming loosened.

The directions of winding the balance windings 4a, 4b upon the field magnet iron cores 5a, 5b, 5c, 5d are predetermined such that the variations in magnetic field that are produced by the currents flowing in the field coils 6a, 6b, 6c, 6d will be suppressed by the magnetic fields produced by the circulating current flowing in the balance windings 4a, 4b. That is to say, referring to FIG. 3, if the potential of the positive-side brush 3a becomes higher than that of the positive-side brush 3b, then the magnetic fields that result from the circulating current flowing in the balance windings 4a, 4b will increase the strength of the magnetic fields of each of the field magnetic poles corresponding to the field magnet iron cores 5b and 5c, and will reduce the strength of the magnetic fields of the poles corresponding to the field magnet iron cores 5a and 5d, such as to cancel out the variations between respective levels of magnetic field strength of the field magnets (caused by the presence of the circulating current as described hereinabove referring to FIG. 2).

As a result, a stable output power characteristic can be achieved for the rotary electric machine.

As described above, preferably a pair of balance windings are utilized as with the described embodiment, however it would be equally possible to utilize only a single balance winding, with similar effects to those described above being achievable.

What is claimed is:

1. A rotary electric machine comprising
a field winding that is wound on a plurality of field magnet iron cores,
an armature having at least four magnetic poles, formed by an armature winding that is lap wound on armature iron cores and is connected in series with said field winding via a pair of positive-side brushes,
a pair of connecting leads which electrically connect said armature winding to said pair of positive-side brushes, and
a balance winding for reducing magnetic force unbalance effects that result from a circulating current flowing from said armature winding through said field winding;
wherein said balance winding is successively wound around each of a plurality of said field magnet iron cores and is thereby held retained by said field magnet iron cores, and wherein said balance winding has a first end thereof electrically connected to and fixedly attached to a first one of said pair of connecting leads and has a second end thereof electrically connected to and fixedly attached to a second one of said pair of connecting leads.

2. A rotary electric machine according to claim 1, wherein said balance winding is wound directly upon said field magnet iron cores.

3. A rotary electric machine according to claim 2, wherein said field winding is wound over said balance winding that is wound upon said field magnet iron cores.

4. A rotary electric machine according to claim 1, wherein said balance winding is formed of a conductor having a smaller cross-sectional area than conductors of said field winding.

5. A rotary electric machine according to claim 1, wherein directions of winding said balance winding on said field magnet iron cores are predetermined such that when circulating currents flow respectively in said balance winding and in said field winding as a result of a potential difference between said pair of positive-side brushes, the respective polarities of magnetic fields produced by said flow of circulating current in said balance winding act to suppress variations between respective strengths of magnetic fields of respective poles of said field magnet caused by said flow of circulating current in said field winding.

* * * * *